US010476385B2

(12) United States Patent
Koniakowsky et al.

(10) Patent No.: US 10,476,385 B2
(45) Date of Patent: Nov. 12, 2019

(54) DC-DC CONVERTER SYSTEM, DC VOLTAGE SUPPLY SYSTEM AND PRINTED CIRCUIT BOARD FOR A DC-DC CONVERTER SYSTEM

(71) Applicant: Robert Bosch GmbH, Stuttgart (DE)

(72) Inventors: Joerg Koniakowsky, Ostfildern (DE); Stefan Aldinger, Bad Wimpfen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/533,814

(22) PCT Filed: Oct. 9, 2015

(86) PCT No.: PCT/EP2015/073338
§ 371 (c)(1),
(2) Date: Jun. 7, 2017

(87) PCT Pub. No.: WO2016/091424
PCT Pub. Date: Jun. 16, 2016

(65) Prior Publication Data
US 2017/0331368 A1    Nov. 16, 2017

(30) Foreign Application Priority Data
Dec. 9, 2014  (DE) .................. 10 2014 225 195

(51) Int. Cl.
*H02M 3/155* (2006.01)
*H02M 1/08* (2006.01)
*H02M 1/00* (2006.01)

(52) U.S. Cl.
CPC ............ *H02M 3/155* (2013.01); *H02M 1/08* (2013.01); *H02M 2001/008* (2013.01); *H02M 2003/1557* (2013.01)

(58) Field of Classification Search
None
See application file for complete search history.

(56) References Cited

U.S. PATENT DOCUMENTS

2002/0125864 A1* 9/2002 Aiello ................... H02M 3/155
                                                  323/267
2004/0027104 A1   2/2004 Ishii et al.
(Continued)

FOREIGN PATENT DOCUMENTS

CN          1866708 A      11/2006
CN        101632984 A       1/2010
(Continued)

OTHER PUBLICATIONS

International Search Report for Application No. PCT/EP2015/073338 dated Feb. 4, 2016 (English Translation, 3 pages).
(Continued)

*Primary Examiner* — Jue Zhang
*Assistant Examiner* — Henry E Lee, III
(74) *Attorney, Agent, or Firm* — Michael Best & Friedrich LLP

(57) ABSTRACT

A DC-DC converter system (1, 1') according to the invention is provided with an input (In) for feeding in an input voltage (U_in), a step-up controller section (2) for increasing the input voltage (U_in) in a controlled manner to a controlled first output voltage (U_out1) and for providing the first output voltage (U_out1) at a first supply output (Out1), and a voltage conversion section (3) for converting the input voltage (U_in) into a second output voltage (U_out2) in a manner controlled by a control device of the step-up controller section (2) and for providing the second output voltage (U_out2) at a second supply output (Out2). The DC-DC converter system (1) according to the invention having two supply outputs (Out1, Out2) is based on an expansion of a step-up controller with a SEPIC circuit, wherein the DC-DC converter system comprises only a single control device (S1) and a switching device (T1) which can be controlled by the control device.

13 Claims, 4 Drawing Sheets

(56) References Cited

U.S. PATENT DOCUMENTS

| | | |
|---|---|---|
| 2010/0019833 A1 | 1/2010 | Zang et al. |
| 2013/0163302 A1* | 6/2013 | Li .................... H02M 3/158 363/127 |
| 2013/0207628 A1 | 8/2013 | Chen et al. |
| 2014/0152104 A1 | 6/2014 | Kung |
| 2014/0153306 A1 | 6/2014 | Pan et al. |

FOREIGN PATENT DOCUMENTS

| | | |
|---|---|---|
| CN | 103249204 A | 8/2013 |
| JP | 2006340432 | 12/2006 |

OTHER PUBLICATIONS

Petersen, L. et al., "Reduction of voltage stresses in buck-boost-type power factor correctors operating in boundary conduction mode," APEC 2003, 18th Annual IEEE Applied Power Electronics Conference and Exposition, Miami Beach, FL, Feb. 9-13, 2003, vol. 2, Feb. 9, 2003, pp. 664-670.

* cited by examiner

DC-DC CONVERTER SYSTEM, DC VOLTAGE SUPPLY SYSTEM AND PRINTED CIRCUIT BOARD FOR A DC-DC CONVERTER SYSTEM

BACKGROUND OF THE INVENTION

The invention relates to a DC-DC converter system and to a DC voltage supply system and a printed circuit board for a DC-DC converter system, and is directed, in particular, to a DC-DC converter system for use in a vehicle for supplying electric switching units and/or control units with different stabilized DC voltages.

In vehicles, in particular passenger cars, electric switching units and control units are supplied from the low-voltage vehicle electrical system (approximately 12 volts) with an input voltage which varies greatly due to input networks (e.g., switches, protective circuit, filters) connected therebetween. In general, the full reliability of the electric switching units and control units is required for an input voltage which varies in the range from approximately 6 volts to 27 volts DC. This large input voltage range is covered by means of electronic power circuits, in particular DC-DC converters or DC voltage controllers, which convert the varying input voltage into stabilized DC voltages having predefined, individual voltage values and supply the electric switching units and control units therewith.

One known approach for supplying the electric switching units and control units with a stabilized DC voltage from the vehicle electrical system consists of increasing the varying input voltage with the aid of a step-up converter or step-up controller, which is also referred to as a boost converter and is illustrated in FIG. 4 by way of example, to a stabilized, increased supply voltage of 30 volts, for example, with the aid of a control device and a switching device.

In addition to the increased voltage, a stabilized 12-volt DC voltage is usually also required, as the further supply voltage, which can be generated according to two known concepts. According to one first known concept, the 12-volt DC voltage is generated directly from the stabilized, increased supply voltage (e.g., 30 volts) with the aid of a linear controller installed downstream from the step-up converter. The great power loss resulting from the high voltage difference of the voltage conversion (e.g., from 30 volts to 12 volts) is disadvantageous in this case. According to one second known concept, the varying input voltage is fed not only to the aforementioned step-up converter, but also to a SEPIC converter (SEPIC: Single Ended Primary Inductance Converter)—which is illustrated in FIG. 5 by way of example—for generating the second supply voltage (e.g., 12 volts) which can be lower or higher than the varying input voltage. One disadvantage of this second concept is that the SEPIC converter, as is also the case with the step-up converter, requires a dedicated control device and switching device, for example designed as a controlled MOSFET, which results in a need for more space and also results in higher costs and possible EMC problems due to the additional switching processes.

SUMMARY OF THE INVENTION

The problem addressed by the invention therefore consists of providing a DC-DC converter system for generating at least two supply voltages from a varying input voltage, which system requires less space and results in lower costs and good EMC properties.

A DC-DC converter system according to the present invention includes an input for feeding in an input voltage, a step-up controller section for increasing the input voltage in a controlled manner to a controlled first output voltage and for providing the first output voltage at a first supply output, and further includes a voltage conversion section for converting the input voltage into a second output voltage in a manner controlled by the control device, i.e., not a controlled conversion, and for providing the second output voltage at a second supply output.

The step-up controller section includes a series circuit of a first inductor and a first diode, which are electrically interconnected at a first interconnection point, and a control device and a switching device, which is controllable by the control device, for the controlled opening or closing of an electric connection between a first contact point of the switching device and a second contact point of the switching device. The first contact point of the switching device is electrically connected to the first interconnection point, and the second contact point of the switching device is electrically connected to ground either directly or via a first resistor. The first diode is arranged with its forward conducting direction from the first interconnection point to the first supply output.

The voltage conversion section includes a series circuit of a second inductor and a second diode, which are electrically interconnected at a second interconnection point, and also a coupling capacitor which electrically couples the first interconnection point and the second interconnection point. The second diode is arranged with its forward conducting direction from the second interconnection point to the second supply output.

The step-up controller section is designed for increasing the input voltage in a controlled manner, whereby the opening and closing of the switching device is controlled. The increase is controlled, in this case, by the control device on the basis of the first output voltage provided at the first supply output, which output voltage is returned to the control device.

As an essential component of the present invention, the voltage conversion section is not designed for controlling the second output voltage provided at the second supply output, however, instead, the voltage provided at the second supply output is controlled by the switching device of the step-up controller section, coupled via the coupling capacitor. The second supply output is therefore uncontrolled and also flows, controlled by the switching device of the step-up controller section.

This essential component of the present invention is based on the fact that the input sections of a known step-up controller and a known SEPIC converter, each of which have control devices and switching devices, are structurally identical and can be advantageously combined. The DC-DC converter system of the present invention is therefore formed by a functional combination of a step-up converter and a SEPIC converter, wherein their respective structurally and functionally similar sections, in particular the first and the second inductors, and the respective switching device, need to be provided only once for the combined use.

The DC-DC converter system of the present invention having a single switching device and a single control device for providing two output voltages therefore allows for a particularly space-saving and cost-effective implementation of a DC-DC converter system having an optimized EMC behavior.

Within the scope of the present invention, the term "diode" is considered to mean a device, in particular designed as a semiconductor element having preferably a PN junction, having a first and a second terminal, which diode establishes an electric connection or, ideally, a short circuit in its forward conducting direction from the first terminal to the second terminal and, in its non-conducting direction from the second terminal to the first terminal, electrically blocks or, ideally, establishes an interruption. The term "ground" or "connected to ground" refers to the standard reference potential which is commonly known by a person skilled in the art. The term "electrically connected" refers to an electrically conducting or electrically conductive connection which, in an idealized form, is represented by a short circuit, and which allows for a flow of an electric current through the connection.

According to one advantageous refinement of the DC-DC converter system of the present invention, this system further includes a third diode, the anode of which is electrically conducted to the input of the DC-DC converter system and/or to the end of the first inductor, which faces away from the first interconnection point, and the cathode of which is electrically connected to the end of the second diode, which faces away from the second interconnection point, in particular the cathode thereof, and/or to the second supply connection. The third diode is therefore arranged with its forward conducting direction from the input connection of the DC-DC converter system to the cathode of the second diode.

Due to the interconnection of the second diode to the third diode, it is advantageously achieved that the output voltage provided at the second supply output does not fall below a required minimum voltage value. In the case of higher input voltages, the second supply output is supplied by the input connection, i.e., by the third diode. In the case of lower input voltages, the output voltage is provided at the second supply output via the second diode.

According to one further advantageous refinement of the DC-DC converter system of the present invention, this system includes, in addition to the third diode, a fourth diode, the anode of which is electrically connected to the second supply connection, to the end of the second diode facing away from the second interconnection point, in particular the cathode thereof, and/or to the cathode of the third diode, and the cathode thereof is electrically connected to the first supply connection and/or to the end of the diode (D1) facing away from the first interconnection point (P1), in particular the cathode thereof. The fourth diode is used as overvoltage protection in the event of rapid load changes.

According to one particularly advantageous refinement of the DC-DC converter system of the present invention, this system is further provided with a linear controller which is designed, in particular, as a low-drop controller or a low-dropout controller, the input side of which is electrically connected to the cathodes of the second and third diodes (D2, D3) and preferably to the anode of the fourth diode (D4), and the output side of which forms a stabilized second supply connection, in order to provide a constant DC voltage as the output voltage.

BRIEF DESCRIPTION OF THE DRAWINGS

The attached FIGS. 1 through 3 illustrate, by way of example, preferred embodiments of the present invention, in which identical reference characters are used in all the figures for components which are identical or correspond to one another. Wherein FIG. 1 shows one first embodiment of an advantageous DC-DC converter system, FIG. 2 shows one advantageous refinement of the DC-DC converter system, FIG. 3 shows one further advantageous DC-DC converter system.

DETAILED DESCRIPTION

Figure 1:
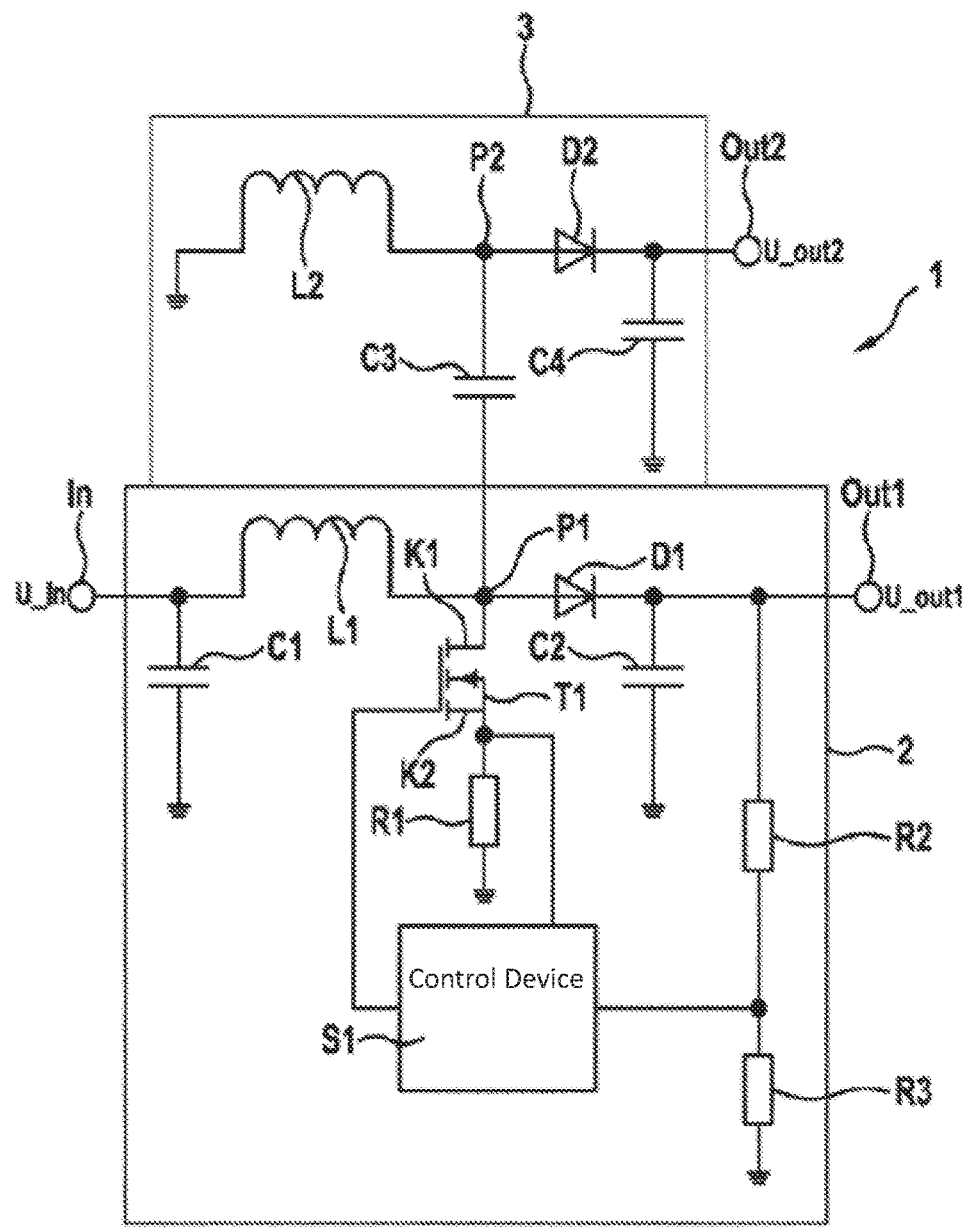

FIG. 1 shows one first embodiment of an advantageous DC-DC converter system 1 comprising an input In for feeding in an input voltage U_in, a step-up controller section 2, and a voltage conversion section 3.

The step-up controller section 2 is formed by a first inductor L1, a first diode D1, an input capacitor C1, a first output capacitor C2, a switching device T1, which is embodied by a MOSFET and has first and second contact points K1 and K2, a control device S1 embodied by an IC, a first resistor R1, a first supply output Out1, and resistors R2 and R3 connected in series as a voltage divider. The input In is electrically connected to one end of the first inductor L1 and to the input capacitor C1 which is connected to ground. The other end of the first inductor L1 is connected at a first interconnection point P1 to the anode of the first diode D1 and to the first contact point K1 of the switching device T1. The first supply output Out1 is electrically connected to the cathode of the first diode D1, to the first output capacitor C2 connected to ground, and to the resistor R2 of the voltage divider R2+R3. At an interconnection point of the series-connected resistors R2 and R3, which form the voltage divider, a voltage which is dependent on the voltage provided at the first supply output Out1 is tapped and is fed to the control device S1 as a control criterion or a control variable for the first output voltage U_out1. The control device S1 is designed for controlling the opening and closing of the switching device T1, which corresponds to an opening and closing of an electrical connection between the contact points K1 and K2 of the switching device T1, in such a way that the voltage U_out1 provided at the first supply output Out1 is controlled to a predefined output voltage, for example 30 V DC.

The voltage conversion section 3 includes the second inductor L2, which is connected at one end to ground, the diode D2, the coupling capacitor C3, and the second output capacitor C4 connected to ground, and the second output voltage Out2. The other end of the second inductor L2 and the anode of the diode D2 are electrically connected to each other at a second interconnection point P2. The cathode of the diode D2 is electrically connected to the second supply output Out2 and to the second output capacitor C4. The coupling capacitor C3 is connected between the first interconnection point P1 and the second interconnection point P2. The second supply output Out2 is uncontrolled. The voltage U_out2 provided there is dependent on the input voltage U_in, a load current at the first supply output Out1, and a load current at the second supply output Out2.

One specific exemplary embodiment according to the invention is designed in such a way that, given an input voltage which varies between 6 volts and 27 volts, the second output voltage U_out2 provided at the second supply output Out2 varies in a range from approximately 2.5 volts and 25 volts. In this case, the highest output voltage U_out2 occurs at the lowest input voltage U_in, and vice versa.

Figure 2:
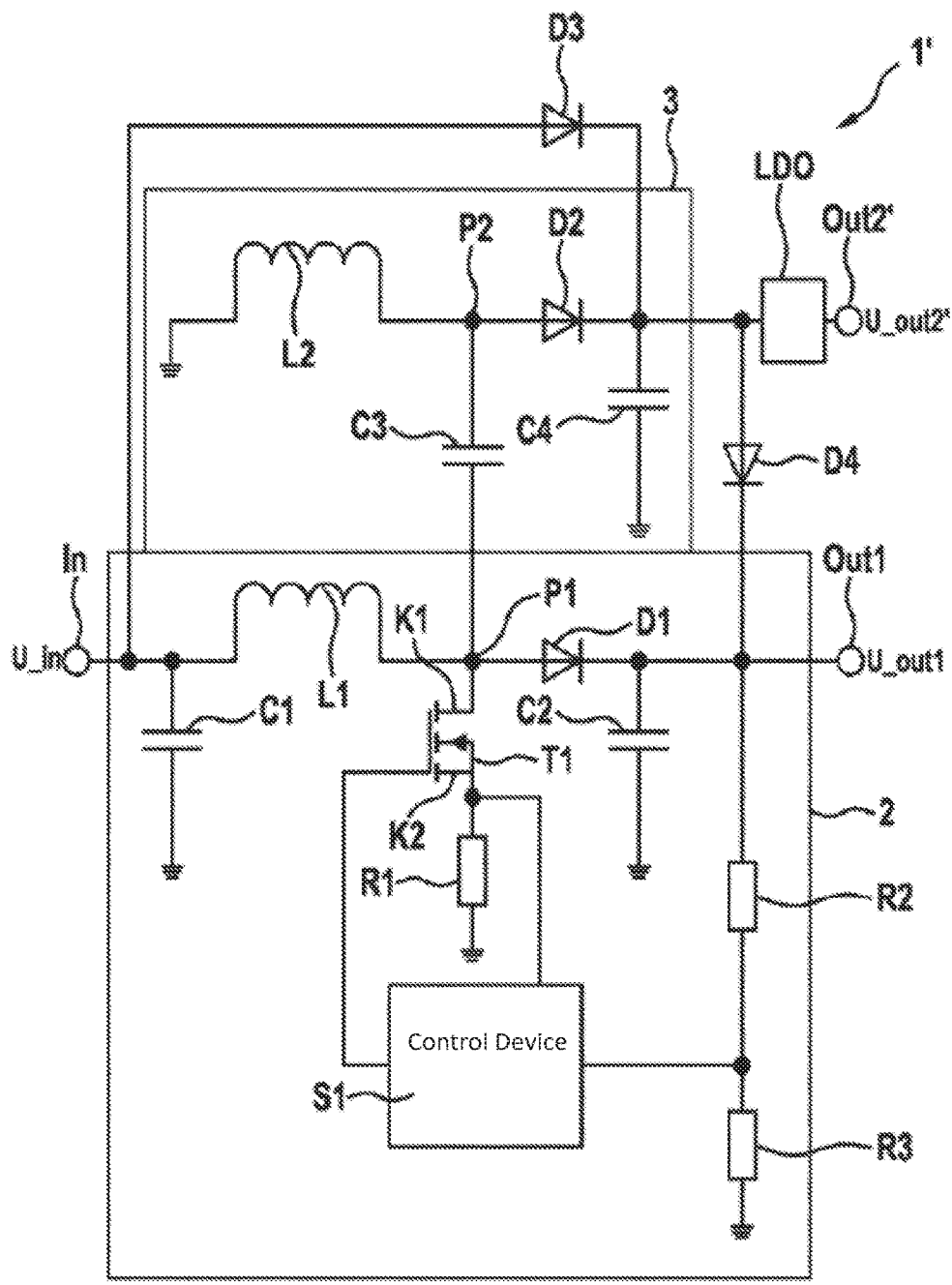

FIG. 2 shows, by way of example, one advantageous refinement of the embodiment which was described above and which was illustrated in FIG. 1. In addition to the components which were already explained and shown in FIG. 1 and which are labeled in FIG. 2 using the same reference characters, the DC-DC converter system 1', according to the invention, of this second embodiment includes a third diode D3, a fourth diode D4, and a linear controller LDO which is preferably designed as a low-drop controller. The diode D3 electrically connects, in the forward conducting direction thereof, the input of the DC-DC converter system to the cathode of the second diode D2. The cathodes of the second and third diodes D2 and D3 are therefore electrically connected to each other. The linear controller LDO, which is designed as a low-drop controller or a low-dropout controller, is connected to the second supply output Out2, which is already known from the embodiment illustrated in FIG. 1. The linear controller LDO provides a stabilized DC voltage U_out2', as a refinement of the aforementioned specific exemplary embodiment, e.g., 12 V DC, at its output Out2' which, in this embodiment, is used as the second supply output of the DC-DC converter system 1. Due to a selected maximum drop-out voltage of the low-drop controller LDO of approximately 2 volts, the input voltage thereof must be greater than or equal to 14 volts. This is achieved across the entire input voltage range from 6 volts to 27 volts via the interconnection of the second and third diodes D2 and D3 to a shared cathode. At lower input voltages U_in, the linear controller LDO is supplied by means of current flow through the second diode D2. At higher input voltages U_in, the linear controller LDO is supplied by means of current flow through the third diode D3, i.e., by a further conduction of the input voltage U_in. The fourth diode D4, which is arranged in the forward conducting direction from the cathodes of the second and third diodes D2 and D3 to the first supply output Out1, is used as overvoltage protection in the event of rapid load changes.

Figure 3:
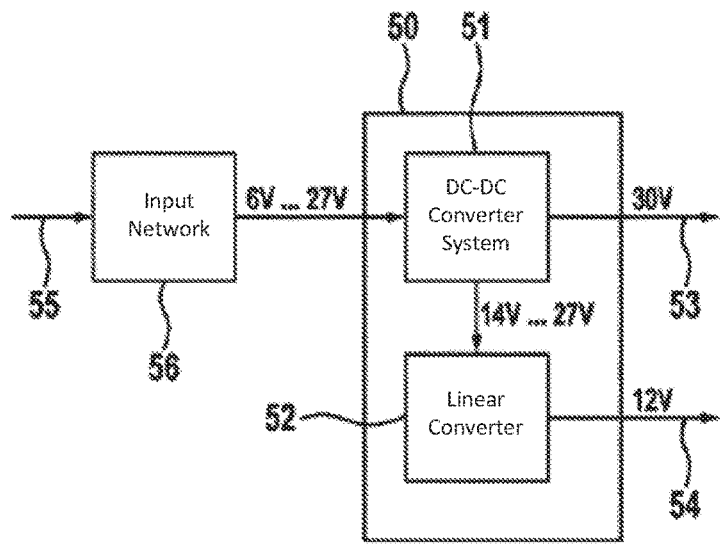
Figure 4:
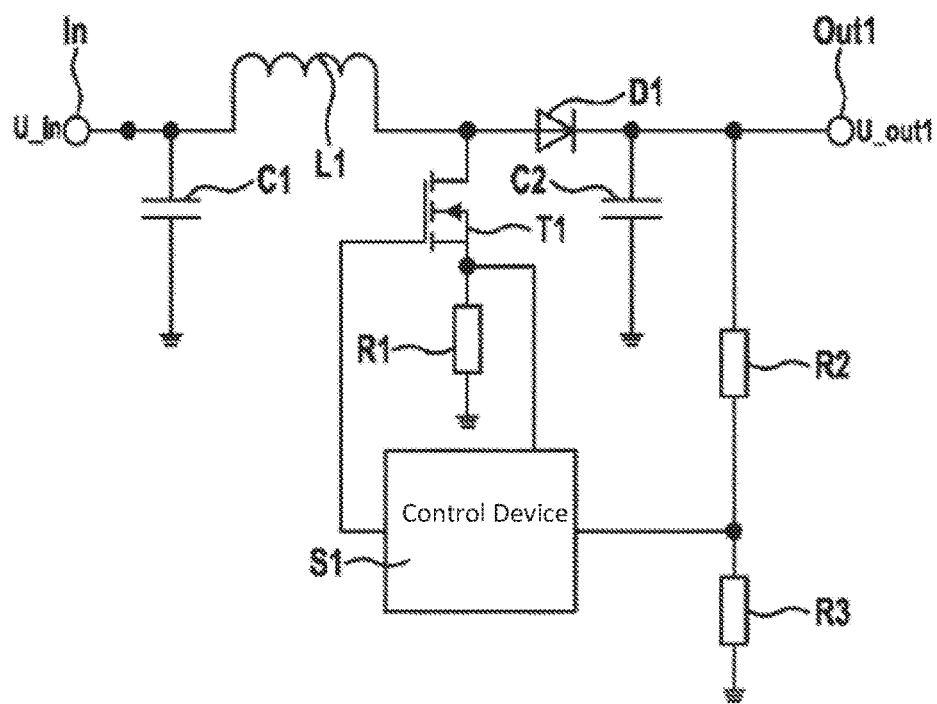
FIG. 4 shows a step-up converter.

In order to illustrate that the present invention is based on a particularly advantageous combination of a step-up controller and a SEPIC converter having a modification in the form of a single switching device and control device, FIG. 3 shows a known step-up converter, and FIG. 4 shows a known SEPIC converter, wherein the reference characters used in FIG. 3 and FIG. 4 relate or refer back to the reference characters used in FIG. 1 and FIG. 2.

Figure 5:
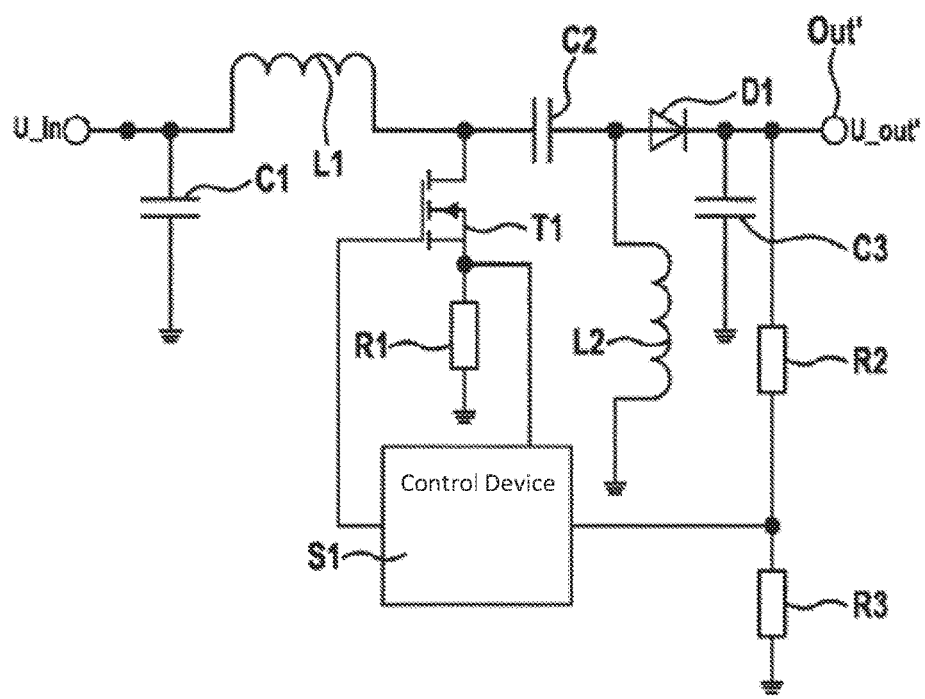
FIG. 5 shows a SEPIC converter.

A comparison of FIG. 1 and FIG. 2 with FIG. 4 and FIG. 5 illustrates that the embodiments of the DC-DC converter system according to the invention, which are represented by way of example, a SEPIC circuit can be integrated into the step-up controller by an expansion of a known step-up controller with the coupling capacitor C3 and the second inductor L2.

FIG. 3 illustrates an advantageous DC-DC converter system 50 (formed by a DC-DC converter system 51 according to the invention and by a linear converter 52 supplied by said system with a DC voltage which varies in the range from 14 to 27 volts). The DC-DC converter system 50 is supplied with an input voltage, which fluctuates in the range from 6 to 27 volts, by a passenger vehicle electrical system 55 via an input network 56 which is formed, for example, by a switch, a protective circuit and/or a filter, and provides a stabilized DC voltage of 30 volts or 12 volts at the two supply outputs 53 and 54 thereof, respectively.

The invention claimed is:

1. A DC-DC converter system (1, 1'), including:
    an input (In) for feeding in an input voltage (U_in); and
    a step-up controller section (2) for increasing the input voltage (U_in) in a controlled manner to a controlled first output voltage (U_out1) and for providing the first output voltage (U_out1) at a first supply output (Out1),
    wherein the step-up controller section further comprises a series circuit of a first inductor (L1) and a first diode (D1), which are electrically interconnected at a first interconnection point (P1), wherein the first diode (D1) is arranged with its forward conducting direction from the first interconnection point (P1) to the first supply output (Out1), and comprises a control device (S1) and a switching device (T1), which is controllable by the control device, for the controlled opening and closing of an electric connection between a first contact point (K1) of the switching device and a second contact point (K2) of the switching device (T1), wherein the first contact point (K1) of the switching device is electrically connected to the first interconnection point (P1), and the second contact point (K2) of the switching device is electrically connected to ground directly or via a first resistor (R1),
    wherein the DC-DC converter system (1, 1') further comprises a voltage conversion section (3) for converting the input voltage (U_in) in a manner controlled by the control device (Si) to a second output voltage (U_out2) and for providing the second output voltage (U_out2) at a second supply output (Out2), wherein the voltage conversion section (3) comprises a series circuit of a second inductor (L2) and a second diode (D2), which are electrically interconnected at a second interconnection point (P2), wherein the second diode (D2) is arranged with its forward conducting direction from the second interconnection point (P2) to the second supply output (Out2), and comprises a coupling capacitor (C3) which electrically couples the first interconnection point (P1) and the second interconnection point (P2),
    wherein the DC-DC converter system is formed by a combination of a step-up converter and a SEPIC converter, wherein the step-up converter and the SEPIC converter share the first inductor, the second inductor, and the switching device for common use by both the step-up controller section and the SEPIC converter.

2. The DC-DC converter system as claimed in claim 1, wherein the input of the DC-DC converter system is electrically connected to an input capacitor (C1) which is connected to ground directly or via a resistor.

3. The DC-DC converter system as claimed in claim 1, wherein the anode of the first diode (D1) is electrically connected to the first interconnection point (P1), and the cathode of the first diode (D1) is electrically connected to the first supply output, to the first output capacitor (C2), or both the first supply output and the first output capacitor, or the anode of the second diode (D2) is electrically connected to the second interconnection point (P2), and the cathode of the second diode (D2) is electrically connected to the second supply output the second output capacitor (C4), or both the second supply output and the second output capacitor.

4. The DC-DC converter system as claimed in claim 1, wherein the switching device (T1) is formed by a field effect transistor, a bipolar transistor, or an IGBT.

5. The DC-DC converter system (1') as claimed in claim 1, further comprising a third diode (D3), the anode of which is electrically connected to the input of the DC-DC converter system, to the end of the first inductor (L1), or both the input of the DC-DC converter system and the end of the first inductor, and the cathode of which is electrically connected to the end of the second diode (D2), to the second supply output, or both the second diode and the second supply output.

6. The DC-DC converter system (1') as claimed in claim 5, further comprising a linear controller (LDO), the input side of which is electrically connected to the cathodes of the second and third diodes (D2, D3), and the output side of which forms a stabilized second supply connection, in order to provide a constant DC voltage as the output voltage.

7. The DC-DC converter system (1, 1') as claimed in claim 1, wherein the DC-DC converter system is designed for the input voltage in the range from 6 to 27 volts DC voltage for providing the first output voltage as 30 volts DC voltage and the second output voltage as 12 volts.

8. A printed circuit board for a DC-DC converter system as claimed in claim 1, wherein the printed circuit board is designed that feeding of the first output voltage provided by the step-up controller section to a linear controller is achieved by components assigned to the voltage conversion section and reversing a polarity connection of a fourth diode (D4).

9. The DC-DC converter system as claimed in claim 1, wherein the first supply output, an end of the first diode (D1), or both the first supply output and the end of the first diode are connected to a first output capacitor (C2) which is connected to ground directly or via a resistor.

10. The DC-DC converter system as claimed in claim 1, wherein an end of the second diode (D2) is connected to a second output capacitor (C4) which is connected to ground directly or via a resistor.

11. The DC-DC converter system as claimed in claim 1, wherein the anode of the second diode (D2) is electrically connected to the second interconnection point (P2), and the cathode of the second diode (D2) is electrically connected to the second supply output, to the second output capacitor (C4), or both the second interconnection point and the cathode of the second diode.

12. The DC-DC converter system (1') as claimed in 5, further comprising a fourth diode (D4), the anode of which is electrically connected to the second supply output, to the end of the second diode (D2) to the cathode of the third diode (D3), or a combination of the same and the cathode of the fourth diode is electrically connected to the first supply output, to the end of the first diode (D1), or both the first supply output and the end of the first diode.

13. A DC-DC converter system (1, 1'), including:
   an input (In) for feeding in an input voltage (U_in); and
   a step-up controller section (2) for increasing the input voltage (U_in) in a controlled manner to a controlled first output voltage (U_out1) and for providing the first output voltage (U_out1) at a first supply output (Out1), wherein the step-up controller section further comprises a series circuit of a first inductor (L1) and a first diode (D1), which are electrically interconnected at a first interconnection point (P1), wherein the first diode (D1) is arranged with its forward conducting direction from the first interconnection point (P1) to the first supply output (Out1), and comprises a control device (S1) and a switching device (T1), which is controllable by the control device, for the controlled opening and closing of an electric connection between a first contact point (K1) of the switching device and a second contact point (K2) of the switching device (T1), wherein the first contact point (K1) of the switching device is electrically connected to the first interconnection point (P1), and the second contact point (K2) of the switching device is electrically connected to ground directly or via a first resistor (R1), wherein the DC-DC converter system (1, 1') further comprises a voltage conversion section (3) for converting the input voltage (U_in) in a manner controlled by the control device (Si) to a second output voltage (U_out2) and for providing the second output voltage (U_out2) at a second supply output (Out2), wherein the voltage conversion section (3) comprises a series circuit of a second inductor (L2) and a second diode (D2), which are electrically interconnected at a second interconnection point (P2), wherein the second diode (D2) is arranged with its forward conducting direction from the second interconnection point (P2) to the second supply output (Out2), and comprises a coupling capacitor (C3) which electrically couples the first interconnection point (P1) and the second interconnection point (P2), wherein the DC-DC converter system further includes a third diode (D3), the anode of which is electrically connected to the input of the DC-DC converter system, to the end of the first inductor (L1) or both the input of the DC-DC converter system and the end of the first inductor, and the cathode of which is electrically connected to the end of the second diode (D2), to the second supply output, or both the end of the second diode and the second supply output.

* * * * *